United States Patent
Chernilevskyy et al.

(10) Patent No.: US 10,141,886 B2
(45) Date of Patent: Nov. 27, 2018

(54) METHOD AND APPARATUS FOR EXTRACTING ELECTRICAL ENERGY FROM PHOTOVOLTAIC MODULE

(71) Applicant: Techinvest-Eco, Limited Liability Company, Kyiv (UA)

(72) Inventors: Ihor Kostiantynovych Chernilevskyy, Lviv (UA); Viktor Serhiyovych Tokarev, Lviv (UA); Stanislav Viktorovych Tokarev, Lviv (UA); Oleksandr Mikhailovich Selezniov, Lviv (UA); Pavlo Germanovich Menshenin, Lviv (UA); Hryhoriy Arhypovych Ilchuk, Lviv (UA); Roman Yuriyovych Petrus, s. Veliki Gilbovichi (UA); Viktor Oleksandrovich Rudak, s. Zaruddia (UA); Serhiy Vasyliovych Loboyko, Lviv (UA); Dmytro Mykolayovych Ianushevskyi, Kyiv (UA)

(73) Assignee: Techinvest-Eco, Limited Liability Company, Kyiv (UA)

( * ) Notice: Subject to any disclaimer, the term of this patent is extended or adjusted under 35 U.S.C. 154(b) by 154 days.

(21) Appl. No.: 15/113,538

(22) PCT Filed: Dec. 23, 2014

(86) PCT No.: PCT/UA2014/000135
§ 371 (c)(1),
(2) Date: Jul. 22, 2016

(87) PCT Pub. No.: WO2015/112107
PCT Pub. Date: Jul. 30, 2015

(65) Prior Publication Data
US 2017/0063297 A1 Mar. 2, 2017

(30) Foreign Application Priority Data
Jan. 24, 2014 (UA) .................. 201400687

(51) Int. Cl.
*H02J 1/10* (2006.01)
*H02S 40/32* (2014.01)
(Continued)

(52) U.S. Cl.
CPC ............... *H02S 40/32* (2014.12); *H02J 3/14* (2013.01); *H02J 3/383* (2013.01); *H02J 3/385* (2013.01);
(Continued)

(58) Field of Classification Search
CPC ......... H02J 3/383; H02J 7/345; Y02E 10/563; H02S 40/32; H02S 50/00
See application file for complete search history.

(56) References Cited

U.S. PATENT DOCUMENTS 7,456,523 B2  11/2008  Kobayashi
7,709,727 B2   5/2010  Roehrig et al.
(Continued)

FOREIGN PATENT DOCUMENTS

CN    101431246 B1    7/2010
CN     20319364  *    4/2013  ............... H02J 7/35
(Continued)

OTHER PUBLICATIONS

Rupesh G. Wandhare et al., "Novel control scheme to reduce the effect of intermittent solar radiation on the grid connected PV system power output without losing MPPT," 27th Annual IEEE Applied Power Electronics Conference and Exposition (APEC), Feb. 5, 2012, pp. 79-85.

*Primary Examiner* — Jared Fureman
*Assistant Examiner* — Duc M Pham
(74) *Attorney, Agent, or Firm* — Kaplan Breyer Schwarz, LLP

(57) ABSTRACT

The present invention relates to the field of energetic, more particularly to generation of photovoltaic direct current followed by its transformation into alternating -AC- or direct
(Continued)

-DC- currents. The invention is applicable to photovoltaic power plants and setups connected either to local AC electrical power distribution systems or to energy storage systems, which apply the known from the prior art devices. According to the claimed method selection electricity from photovoltaic module (1) by which the energy of solar radiation is converted to an electrical signal, pre-store energy electrical signal by using capacitor (2) not less than 0.15 Farad, charged to the maximum power voltage photovoltaic module that determined from the current-voltage characteristics, normalized voltage electrical signal using a DC/DC converter and accumulate. At the same time selected energy is converted to alternating current through DC/AC inverter (3) and continuously is served into a AC local grid (6) while power DC/DC converters and (or) DC/AC inverter installed on for at least one of three levels that is not less than the power of photovoltaic module with a minimum insolation, the maximum insolation and for at least one intermediate insolation.

5 Claims, 9 Drawing Sheets

(51) Int. Cl.
*H02J 3/38* (2006.01)
*H02S 40/38* (2014.01)
*H02J 3/14* (2006.01)
*H02J 7/35* (2006.01)
*H02S 50/00* (2014.01)
*H02J 7/34* (2006.01)

(52) U.S. Cl.
CPC ............... *H02J 7/35* (2013.01); *H02S 40/38* (2014.12); *H02S 50/00* (2013.01); *H02J 7/345* (2013.01); *Y02E 10/563* (2013.01); *Y02E 10/58* (2013.01)

(56) References Cited

U.S. PATENT DOCUMENTS

| | | | |
|---|---|---|---|
| 7,808,213 B2 | 10/2010 | Tsai et al. | |
| 8,400,134 B2 | 3/2013 | Moussaoui et al. | |
| 2010/0156185 A1* | 6/2010 | Kim | H01M 16/003 307/72 |
| 2011/0298305 A1* | 12/2011 | Chisenga | H02M 3/156 307/151 |
| 2014/0376270 A1* | 12/2014 | Kern | H02M 3/33507 363/17 |

FOREIGN PATENT DOCUMENTS

| | | |
|---|---|---|
| CN | 203193364 | 9/2013 |
| EP | 2075895 A2 | 7/2009 |
| RU | 2195754 C | 11/2001 |
| UA | 51651 B | 12/2002 |

* cited by examiner

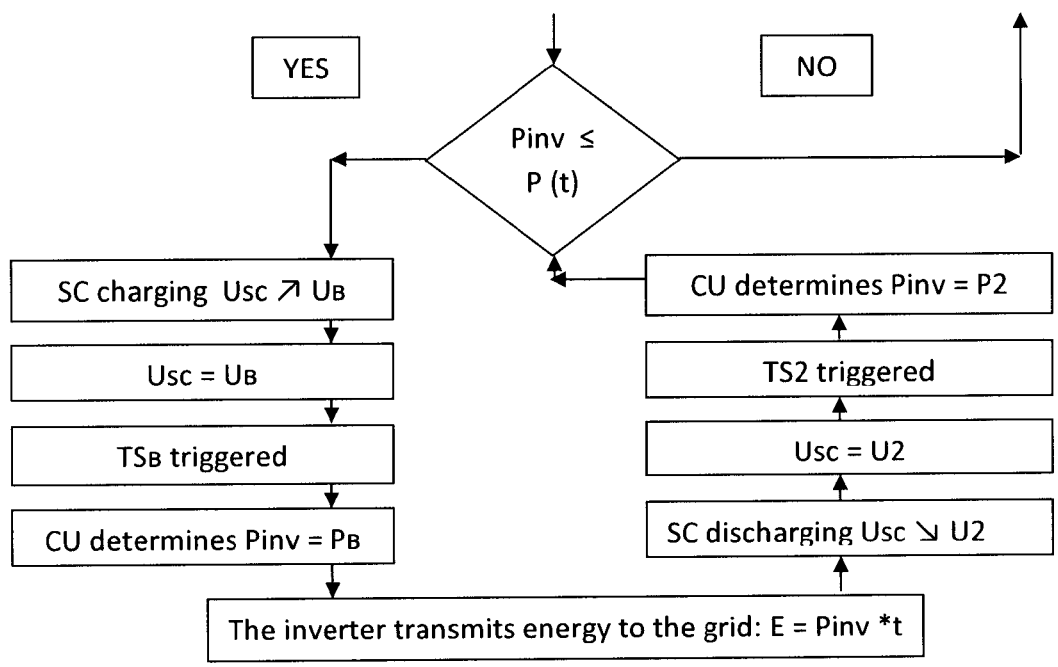
FIG. 7 (continuation)

METHOD AND APPARATUS FOR EXTRACTING ELECTRICAL ENERGY FROM PHOTOVOLTAIC MODULE

CROSS-REFERENCE TO RELATED APPLICATIONS

This application claims the priority of Ukraine Patent Application No. a2014 00678 filed on Jan. 24, 2014, in the Ukrainian Institute of Industrial Property, the disclosure of which is incorporated herein by reference.

BACKGROUND OF THE INVENTION

1. Field of the Invention

The present invention relates to the field of energetic, more particularly to generation of photovoltaic direct current followed by its transformation into alternating (AC) or direct (DC) currents. The invention is applicable to photovoltaic power plants and setups connected either to local AC electrical power distribution systems or to energy storage systems, which apply the known from the prior art devices.

2. Description of the Related Art

The drawbacks, attributed to the nature of any photovoltaic cells, are the limiting factors for wide development of plants converting solar radiation directly into electrical energy. These drawbacks arise because photovoltaic cells exist only together with directly connected p-n or heterojunctions, consequently:

photovoltaic cell generates only DC;
a power generated is directly proportional to the illumination level of the photovoltaic cells surface (insolation).

Because photoelectric convertors (and photoelectric modules) can generate only direct current (DC), while local industrial electrical power distribution systems (LIEDS) are predominantly AC, a large number of techniques to invert DC into AC have been developed and are known from prior art to date. Nevertheless, all of them are based on the principle of switching the direct current, flowing through the load, ON-and-OFF repeatedly at a fast rate. Devices designed for DC to AC inversion known as DC/AC inverters. In case of photoelectric convertors, the external load is connected in parallel with p-n junction (in the direct direction). This p-n junction absorbs energy of photoelectric convertors when external load is switched OFF, that is one of the most important reasons for losses in the DC/AC inversion.

The directly proportional dependence of current generated upon insolation of the land-based photoelectric convertors is the reason for continuous changes in the initial power of PV modules. This is due to both declining an incidence angle of solar radiation at the surface of solar cells during a day (predictable changes) and changes in the atmosphere transparency (cloudiness—weakly predictable changes). Any deviations of the supplying power from the load power in case of solar cells leads to instantaneous and irrevocable losses of energy.

In order to prevent these losses, more than 25 different methods for tracking the maximum power point of photovoltaic panels (Maximum Power Point Tracking—MPPT) used in the DC/AC inverters have been developed and described to date. Common for these MPPT methods are:

measurement of the actual parameters of the PV module at the exact time;
systematic execution of calculation cycle of PV module power;
systematic adjustments of DC/AC inverter power.

The main losses of energy generated by PV module are:

losses during the load disconnection required for the systematic measurements of the real parameters of PV module;
losses due to imbalance between the PV module power and the DC/AC inverter power that appears during time between two successive corrections;
switching losses in DC/AC inverter in the short part of each cycle when the device is partially OFF.

There are several technical solutions to overcome these loses. The examples are:

A circuit arrangement for controlling/regulating photovoltaic systems comprising a plurality of solar generators connected in series and/or in parallel is described in the U.S. Pat. No. 7,709,727 [1], in which each solar generator of the photovoltaic systems is connected with a variable energy bypass that is controlled/regulated in such a manner, that each solar generator is operated continuously in its respective current specific MPP to overcome the losses associated with fluctuation of parameters of the individual PV modules and the difference in insolation conditions at large area.

U.S. Pat. No. 7,456,523 [2] describes a power generation system which comprises a plurality of the connected in parallel sets of PV module and power converters connected to the inverters to supply the alternating current power to a commercial power grid. The system allows to overcome the losses associated with fluctuation of parameters of the individual PV module because each power converter controls the output current and voltage of PV module (maximum power point tracking, MPPT), performs DC/DC conversion to even PV module voltage with voltage of the local industrial grid and DC/AC inversion, synchronization of each power converter with the grid. The described solution provides energy gain by 5-15% and the power generation system continuing function in case of failure or power loss by any of the PV module. The weaknesses of the described administration system are associated to the lack of a compensation of the energy lost due to MPPT control, a high complicity of a system because of necessity to synchronize a plurality of the independent power sources, the use of DC/DC convertor working in the mode ON-OFF.

The U.S. Pat. No. 8,400,134 [3] describes the apparatus and method for tracking the maximum power point (MPPT) of a solar panel, in accordance with which the voltage and current, generated by the solar panel, are monitored and used to generate a pulse signal for charging a capacitor, that decreases the losses associated with ON-OFF mode operation, being typical for both DC/DC and DC/AC converters. When the capacitor voltage exceeds the predetermined level, a part of energy is skipped through the switch causing a short circuit between the current source and the ground. The evident shortcomings and restrictions of this solution are: i) take-off electrical energy from photovoltaic module is realized in impulse mode, similarly as in case of direct connection PV module to DC/DC and DC/AC converters; ii) a part of energy is skipped through a short circuit between the current source and the ground, that is an additional source of energy loss; iii) the apparatus is operating at current of 800 mA, which is a usual limit for electrolytic capacitors.

The apparatus and method, described in the U.S. Pat. No. 7,808,213 and EP Patent 2075895 [4, 5], use a flexible textile capacitor with a total energy from 35 to 112 J. The capacitor is connected to PV module output in parallel; and when the said capacitor is charged to a predetermined charging level, it discharges a current to the charging part of the power supplier of mobile electronic device, e.g. cell phone. Thus the power supplier described operates in a mode like DC/DC converter. At a low insolation level (≤25%) this systems allows to enhance efficiency of 3-7 times as compared with the direct connection of the PV module to the charging part of the power supplier. At an insolation level of about 80%, the gain in energy obtained is 3-6%. The described solution has a quite narrow application, limited by low-power electronic devices and is not provided for exploitation for energy transformation to commercial power grids.

The closest solutions, to what is claimed by this invention, are described in the Ukrainian Patent UA 51651 and Russian Patent RU 2195754 [6,7], which suggest for take-off energy to apply a capacitor charged to the level equal to the MPP voltage of PV module. The apparatus includes a PV module, a capacitor, two threshold voltage controllers adjusted on the upper and lower thresholds, DC/DC converter with pulse-width modulation (PWM), and the feedback means for voltage. Whereas, the upper threshold voltage for triggering off the sensor is set equal to the MPP voltage of PV module at the maximum level (100%) of insolation; and the lower threshold voltage is set to be by 3-5% smaller than the upper threshold voltage. The capacitance has been chosen in the range of 0.02-100 F. The internal resistance of capacitor is chosen to be an order lower than the internal resistance of the PV module under maximum insolation conditions. Power of DC/DC converter is unchangeable in spite of changes in power of the PV module at any certain time. A method of electric energy take-off using the apparatus described provides for the charging of the capacitor to the voltage $U_B$, forming an energy pulse with the power and voltage normalized by the DC/DC converter using energy previously accumulated in the capacitor and energy continually supplied from the PV module. The energy pulses received are used to charge the rechargeable battery (RB).

In accordance to that invention, the method and apparatus provides, due to electric capacity and low internal resistance of the capacitor used, a continuous energy take-off from the PV module at its maximum power point under any operating modes of DC/DC converter, extraction of electrical energy flow in a wide range of PV module power, normalization of the energy impulse over the power and voltage regardless of the instantaneous power of the PV module, more efficient use of energy of PV module—capacitor, reducing energy loss by 25-52% for long-term (daily) exposure of the PV module, simplicity of performance and operation.

SUMMARY OF THE INVENTION

The main objective of the present invention is minimization of the electrical energy losses during take-off of electrical energy from PV module and its transformation via improving the efficiency of the system PV module—device in a wide range of insolation, followed by transformation of the energy received into energy that either can be transferred to the AC electrical power distribution systems (local grid) or that can be used for supplying the energy storage systems, which apply one of the many known methods for energy storage.

This task is solved in such a way, that in the method for take-off of electrical energy from the photovoltaic module connected in parallel to the input of DC/DC converter or to the input of DC/AC inverter with connected to them in parallel a capacitor and a means for voltage measurement, and the latter being connected to the module controlling the inverter, the following parameters are measured: i) voltage $U_B$ at the maximum power point of PV module under maximal level of insolation, ii) the minimal voltage $U_0$ which is not less as 5% of the open circuit voltage of PV module in the case of DC/DC converter or not less as 25% in the case of DC/AC inverter, iii) voltage $U_1$ at the maximum power point of PV module under at least one intermediate level of insolation between its maximal and minimal values.

Then the DC/DC converter or the DC/AC inverter is adjusted to one of the power levels ($P_x$), which is not less as the maximal power of PV module under either minimal insolation ($P_0$), either maximal insolation ($P_B$), or at least one intermediate insolation ($P_1$) between minimal and maximal insolation in accordance with the following rules.

At arising and increasing insolation, energy from PV module is transferred to capacitor and collected there continuously; according to the invention, voltage on the capacitor ($U_C$) is measured simultaneously, and when $U_C$ achieves the value $U_0$, the means for voltage measurement (MVM) sends a signal to switch the control module on; when $U_C$ achieves the value $U_1$ the control module sends a signal to the DC/DC converter or the DC/AC inverter to operate at the power level $P_1$; when $U_C$ achieves the value $U_B$ the control module sends a signal to the DC/DC converter or the DC/AC inverter to operate at the power level $P_B$.

At decreasing insolation, the DC/DC converter or the DC/AC inverter consumes energy collected by the capacitor. When $U_C$ drops down to the value $U_1$ the control module sends a signal to the DC/DC converter or the DC/AC inverter to operate at the power level $P_1$; when $U_C$ drops down to the value $U_0$, the means for voltage measurement (MVM) sends a signal to the DC/DC converter or the DC/AC inverter to operate at the power level $P_0$; when $U_C$ drops down to the value lower than $U_0$, the means for voltage measurement (MVM) sends a signal to switch the DC/DC converter or the DC/AC off.

The extracted energy can be transformed into alternating current by means of the DC/AC inverter and continuously transferred to a local AC electrical power distribution system (local grid), otherwise, the extracted energy can be transformed by means of the DC/DC converter and supplied to the energy storage system. In both cases power of DC/AC inverter or the DC/DC converter is adjusted to at least one of three levels which are not less as power of PV module under either minimal insolation, either maximal insolation, or at least one intermediate insolation between minimal and maximal insolations.

Other tasks of the invention were: 1) to design an apparatus for take-off the electric energy from PV module, which provides minimization of the electrical energy losses at its extraction from PV module via improving the efficiency of the device in a wide range of insolation levels, and 2) transformation of electric energy generated by PV module into energy suitable either for transferring to a local AC electrical power distribution system (local grid) or for supplying the energy storage system.

These tasks are solved in such a way, that in the apparatus for extraction of electrical energy from PV module, which includes:

1) the DC/AC inverter with a power, being not less than the PV module nominal power, and with the possibility of its connection to a local AC electrical power distribution system (local grid); or the DC/DC converter with a power, being not less than the PV module nominal power, and with the possibility of its connection to input of the energy storage system;

2) the capacitor connected in parallel to the input of inverter or converter;

3) the means for voltage measurement (MVM) on the capacitor;

4) the control module connected to DC/AC inverter or DC/DC converter and connected to the means for voltage measurement on the capacitor,— in accordance with the invention:

1) DC/AC inverter or DC/DC converter are designed to be capable of changing their power at least at three levels;

2) the means for voltage measurement is designed to be capable of supplying the information regarding at least three predetermined fixed values of the capacitor voltage to the control module;

4) the control module (CM) is designed to be capable of switching the power levels of the DC/AC inverter or the DC/DC converter depending on the capacitor voltage;

5) the internal resistance of the capacitor is at least twice lower than the internal resistance of the PV module at its MPP, while capacity of the capacitor is defined as follows:

$$C \geq (k \cdot P_B)/(U_B^2 - U_1^2), \quad (1)$$

where C is capacitance of the capacitor in Farads (F); $P_B$ is maximal power of PV module under its maximal insolation in Watts (W); $U_B$ is voltage of PV module at the maximum power point (MPP) under maximal insolation in Volts (V); $U_1$ is an intermediate fixed voltage at the MPP under insolation that is less than maximal insolation closest to the $U_B$ in Volts (V); k is the factor with an absolute value of 0.3-0.5 second (sec).

In this embodiment, a combined unit consisting at input of one or more DC/DC converters and DC/AC inverter at output can be used as the DC/AC inverter.

In this embodiment, as the means for voltage measurements can be used at least three means for voltage measurement (MVM), each of which generates a signal indicating on certain value of voltage on the capacitor.

In this advantageous embodiment, the control module is a microprocessor; otherwise the control module can be made mainly of basic hard-wired logic elements.

For identification of the apparatus according to the invention, it is proposed to use the acronym of the first letters in its name in English: Electrical Energy Take-Off System—EETOS.

BRIEF DESCRIPTION OF THE DRAWINGS

The claimed invention is illustrated by the following example for realization of the method for electrical energy take-off from PV module and apparatus for its implementation as well as the relevant drawings, which represent the following:

Figure 1:
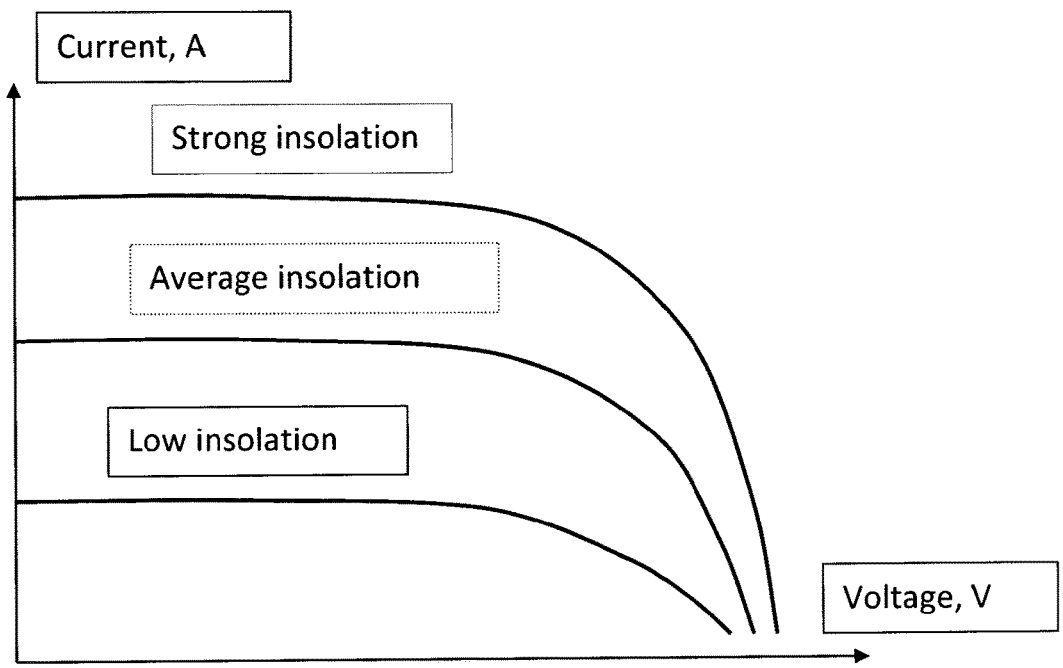
FIG. 1. Current-voltage characteristics of PV module under different insolation levels.

The drawings, illustrating the claimed invention, as well as the shown example of embodiment of the method and apparatus for its realization do not restrict or limit in any way the scope of invention in according to the claims, but only explain the core of the invention.

DETAILED DESCRIPTION OF THE PREFERRED EMBODIMENT

Simulations and experimental tests were performed to check the possibility of achieving the technical result, which allowed to define the optimum parameters of the capacitor, particularly its internal resistance and capacitance value. The simulation results are presented in Tables 1-4. As tables 1-4 show, the technical results derived manifest a substantial increase in the efficiency of the system, when using the claimed method and apparatus; and this requires the capacitor internal resistance to be at least twice lower than the internal resistance of the PV module.

TABLE 1

The dependence of the efficiency on the capacitor internal resistance Rsc for the system of PV module - device under condition of equal both the internal resistance of energy sources Rs and the load RL

| Efficiency | Rs | Rsc | Integrated mark of system functioning |
| --- | --- | --- | --- |
| 0.500 | 1 | Without capacitor | |
| 0.500 | 0.9990 | 1000 | unsatisfactorily |
| 0.502 | 0.9901 | 100 | unsatisfactorily |
| 0.524 | 0.9091 | 10 | unsatisfactorily |
| 0.545 | 0.8333 | 5 | unsatisfactorily |
| 0.600 | 0.6667 | 2 | unsatisfactorily |
| 0.667 | 0.5000 | 1 | unsatisfactorily |
| 0.750 | 0.3333 | 0.5 | satisfactorily |
| 0.857 | 0.1667 | 0.2 | OK |
| 0.917 | 0.0909 | 0.1 | OK |
| 0.955 | 0.0476 | 0.05 | OK |
| 0.981 | 0.0196 | 0.02 | OK |
| 0.990 | 0.0099 | 0.01 | OK |

TABLE 2

The dependence of the efficiency on insolation level for the system of PV module - device under following conditions: sources internal resistance Rs = RL, Rsc = 1 Ohm

| Efficiency | Rpv | Insolation level | Integrated mark of system functioning |
| --- | --- | --- | --- |
| 0.667 | 1 | 100.0% | unsatisfactorily |
| 0.655 | 1.11 | 90.0% | unsatisfactorily |
| 0.643 | 1.25 | 80.0% | unsatisfactorily |
| 0.630 | 1.43 | 70.0% | unsatisfactorily |
| 0.615 | 1.67 | 60.0% | unsatisfactorily |
| 0.600 | 2.00 | 50.0% | unsatisfactorily |
| 0.583 | 2.50 | 40.0% | unsatisfactorily |
| 0.565 | 3.33 | 30.0% | unsatisfactorily |
| 0.545 | 5.00 | 20.0% | unsatisfactorily |
| 0.524 | 10.00 | 10.0% | unsatisfactorily |
| 0.512 | 20.00 | 5.0% | unsatisfactorily |
| 0.505 | 50.00 | 2.0% | unsatisfactorily |

TABLE 3

The dependence of the efficiency on insolation level for the system of PV module - device under following conditions: sources internal resistance Rs = RL, Rsc = 0.5 Ohm

| Efficiency | Rpv | Insolation level | Integrated mark of system functioning |
|---|---|---|---|
| 0.750 | 1 | 100.0% | satisfactorily |
| 0.744 | 1.11 | 90.0% | satisfactorily |
| 0.737 | 1.25 | 80.0% | satisfactorily |
| 0.730 | 1.43 | 70.0% | satisfactorily |
| 0.722 | 1.67 | 60.0% | satisfactorily |
| 0.714 | 2.00 | 50.0% | satisfactorily |
| 0.706 | 2.50 | 40.0% | satisfactorily |
| 0.697 | 3.33 | 30.0% | satisfactorily |
| 0.688 | 5.00 | 20.0% | satisfactorily |
| 0.677 | 10.00 | 10.0% | unsatisfactorily |
| 0.672 | 20.00 | 5.0% | unsatisfactorily |
| 0.669 | 50.00 | 2.0% | unsatisfactorily |

TABLE 4

The dependence of the efficiency on insolation level for the system of PV module - device under following conditions: sources internal resistance Rs = RL, Rsc = 0.33 Ohm

| Efficiency | Rpv | Insolation level | Integrated mark of system functioning |
|---|---|---|---|
| 0.801 | 1 | 100.0% | OK |
| 0.797 | 1.11 | 90.0% | OK |
| 0.793 | 1.25 | 80.0% | OK |
| 0.789 | 1.43 | 70.0% | OK |
| 0.784 | 1.67 | 60.0% | OK |
| 0.779 | 2.00 | 50.0% | OK |
| 0.774 | 2.50 | 40.0% | OK |
| 0.769 | 3.33 | 30.0% | OK |
| 0.764 | 5.00 | 20.0% | OK |
| 0.758 | 10.00 | 10.0% | satisfactorily |
| 0.755 | 20.00 | 5.0% | satisfactorily |
| 0.753 | 50.00 | 2.0% | satisfactorily |

To determine the optimum capacitances of the capacitor, the critical modes for the apparatus operation have been simulated, namely the operations at the maximum power of inverter ($P_{max}$) and minimum power of PV module ($P_{low}$).

The maximal power of inverter ($P_{max}$) is characteristic for function of the apparatus under high insolation of PV module. Power switch-over on the inverter input should, however, provide a satisfactory Power Quality (PQ) at the inverter output. As it follows from the practice, time for disturbed operation of the inverter at a certain power level should be of several tenths of second till several seconds depending on the type and functioning conditions of the power grid. To provide this, the capacitor should be able to accumulate the appropriate energy reserve necessary for power changing, which can be estimated using the formula:

$$E = P_{max} \cdot t \quad (2)$$

where t is time of transitional process at changing the power.

At operation of the apparatus under conditions of minimal power (insolation), interruption in transferring energy from PV module to inverter is possible. In this case, the energy accumulated in the capacitor has to provide conditions of Bridging Power (BP) on the inverter input. The required energy can be estimated by formula:

$$E = P_{low} \cdot t \quad (3)$$

where t is the interruption time in gaining energy from PV module.

The estimation of energy required was performed for standard PV modules: PVM-1 with rated power of 280 W, PVM-2 with rated power of 180 W, and PVM-3 with rated power of 20 W (the prototype [3]). These estimation results are gathered in Table 5.

TABLE 5

The value of electrical energy that reserved by capacitor for PV modules with different rated power and for different requirements

| PV module | Mode | Power (P), W | Requirements | P · t, J |
|---|---|---|---|---|
| PVM 1 | Pmax | 280 | PQ | 140 |
| PVM 1 | Pmid | 140 | PQ | 70 |
| PVM 1 | Plow | 56 | BP | 112 |
| PVM 2 | Pmax | 180 | PQ | 90 |
| PVM 2 | Pmid | 90 | PQ | 45 |
| PVM 2 | Plow | 36 | BP | 72 |
| PVM 3 | Pmax | 22 | PQ | 11 |
| PVM 3 | Pmid | 11 | PQ | 6 |
| PVM 3 | Plow | 4 | BP | 8 |

When certain amount of energy is taken off from capacitor, its voltage shouldn't decline from MPP of PV module above a certain value. In accordance with the investigations performed, the optimum for such decline is in the range of $\Delta = 3-5\%$. In this case, energy of the capacitor is changed by the value:

$$Esc = ((U_B^2 - U_1^2) \cdot C)/2 \quad (4)$$

where C is capacitance of the capacitor, $U_B$ is voltage of PV module at PMM under maximal insolation, $U_1$ is an intermediate fixed voltage, which is close to voltage $U_B$.

Thus, capacitance of the capacitor can be determined by the formula:

$$C \geq (k \cdot P_B)/(U_B^2 - U1^2) \quad (5)$$

where $P_B$ is the inverter power that corresponds to PV module voltage at its MPP under maximal insolation; k is an empirical coefficient, which has the dimensions of a unit of time.

The value of k can be estimated depending on the capacitor parameters:

$$k = 2 \cdot \tau \cdot (1 - U_1^2/U_B^2) \quad (6)$$

where $\tau$ is the time constant, which depends on the manufacturing technology of the certain type of capacitor and on internal resistance of the capacitor $R_{SC}$, the algorithm for determining the value of which is shown above.

To determine the optimal values of the coefficient k authors performed a large number of calculations with further modeling and experimental assessment of the apparatus for 1.45 sec ≤ τ ≤ 4.5 sec. Evaluation of k values has been performed for the 280 W PV module (PVM-1), 180 W PV module (PVM-2), and 20 W PV module (PVM-3[3]). The results of these simulations and experiments are shown in Table 6. It was found that the k value, which provides the stable technical effect and determines capacitance of the capacitor, is lying in the range of 0.26-0.53.

Device for electrical energy take-off from the photovoltaic module (FIG. 2, 3) comprises PV module (1), capacitor (2), DC/AC inverter (3), a means for voltage measurement on the capacitor (4), and the control module (5).

TABLE 6

The value of coefficient k for PV modules with different Uoc and for different capacitors

| k | Rpv | Rsc | τ | UB | ΔU | Δ | Integrated mark of system functioning |
|---|---|---|---|---|---|---|---|
| 0.141 | 1 | 1 | 1.45 | 22 | 1.1 | 5.0% | unsatisfactorily |
| 0.283 | 1 | 0.5 | 1.45 | 22 | 1.1 | 5.0% | satisfactorily |
| 0.428 | 1 | 0.33 | 1.45 | 22 | 1.1 | 5.0% | OK |
| 0.707 | 1 | 0.2 | 1.45 | 22 | 1.1 | 5.0% | OK |
| 0.114 | 1 | 1 | 1.45 | 33 | 1.32 | 4.0% | unsatisfactorily |
| 0.227 | 1 | 0.5 | 1.45 | 33 | 1.32 | 4.0% | satisfactorily |
| 0.344 | 1 | 0.33 | 1.45 | 33 | 1.32 | 4.0% | OK |
| 0.568 | 1 | 0.2 | 1.45 | 33 | 1.32 | 4.0% | OK |
| 0.086 | 1 | 1 | 1.45 | 53 | 1.59 | 3.0% | unsatisfactorily |
| 0.171 | 1 | 0.5 | 1.45 | 53 | 1.59 | 3.0% | satisfactorily |
| 0.260 | 1 | 0.33 | 1.45 | 53 | 1.59 | 3.0% | OK |
| 0.428 | 1 | 0.2 | 1.45 | 53 | 1.59 | 3.0% | OK |
| 0.266 | 1 | 1 | 4.5 | 53 | 1.59 | 3.0% | unsatisfactorily |
| 0.532 | 1 | 0.5 | 4.5 | 53 | 1.59 | 3.0% | satisfactorily |
| 0.806 | 1 | 0.33 | 4.5 | 53 | 1.59 | 3.0% | OK |
| 1.330 | 1 | 0.2 | 4.5 | 53 | 1.59 | 3.0% | OK |

As the DC/AC inverter (3) can be used a combined unit consisting of one or more DC/DC converters at input and DC/AC inverter at output.

Figure 3:
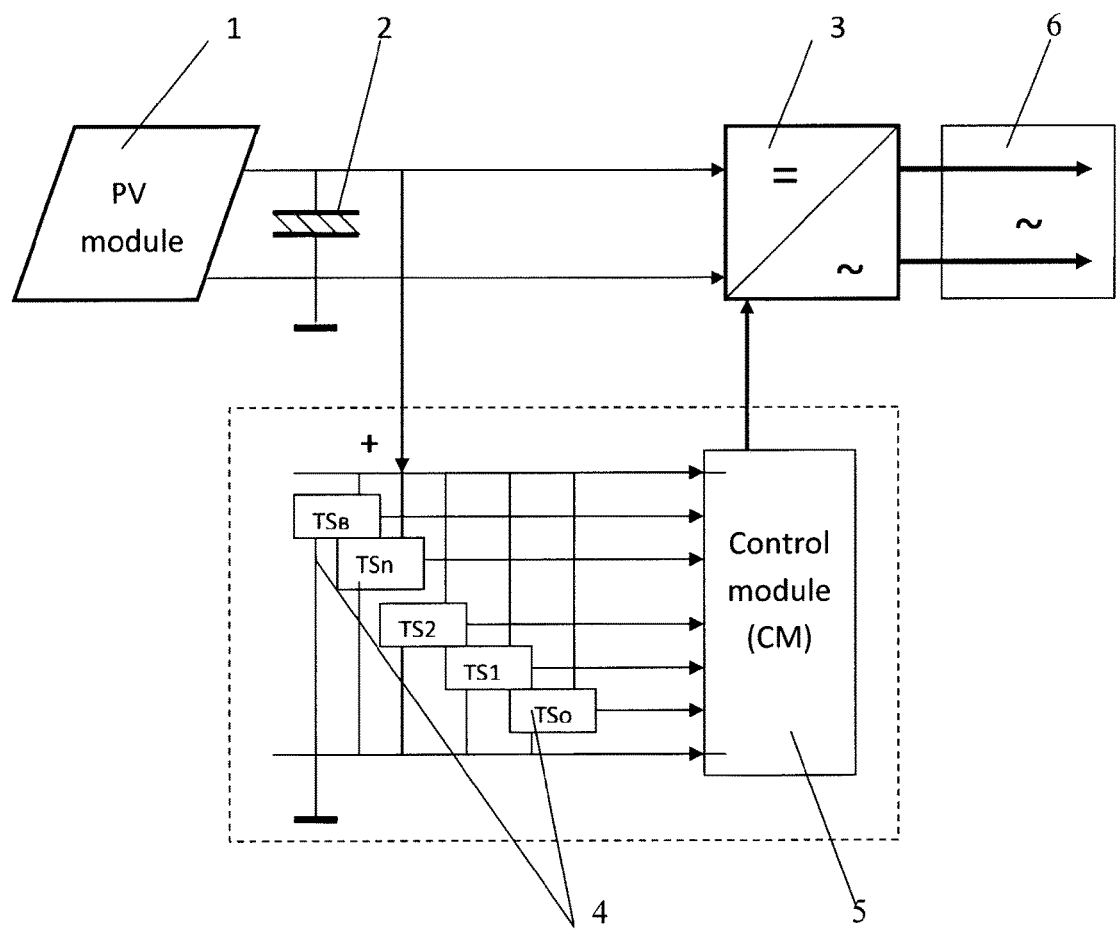
FIG. 3. Block-scheme of the apparatus for n-level electrical energy take-off from PV module if using MVM according to the invention.

As the means for voltage measurements (4) can be used at least three voltage threshold sensors (TS), each of which generates a signal indicating on a certain value of voltage on the capacitor (n voltage threshold sensors (TSn) are shown in FIG. 3). The control module (5) can be implemented as a microprocessor or can be made of basic (standard) logic elements.

Figure 2:
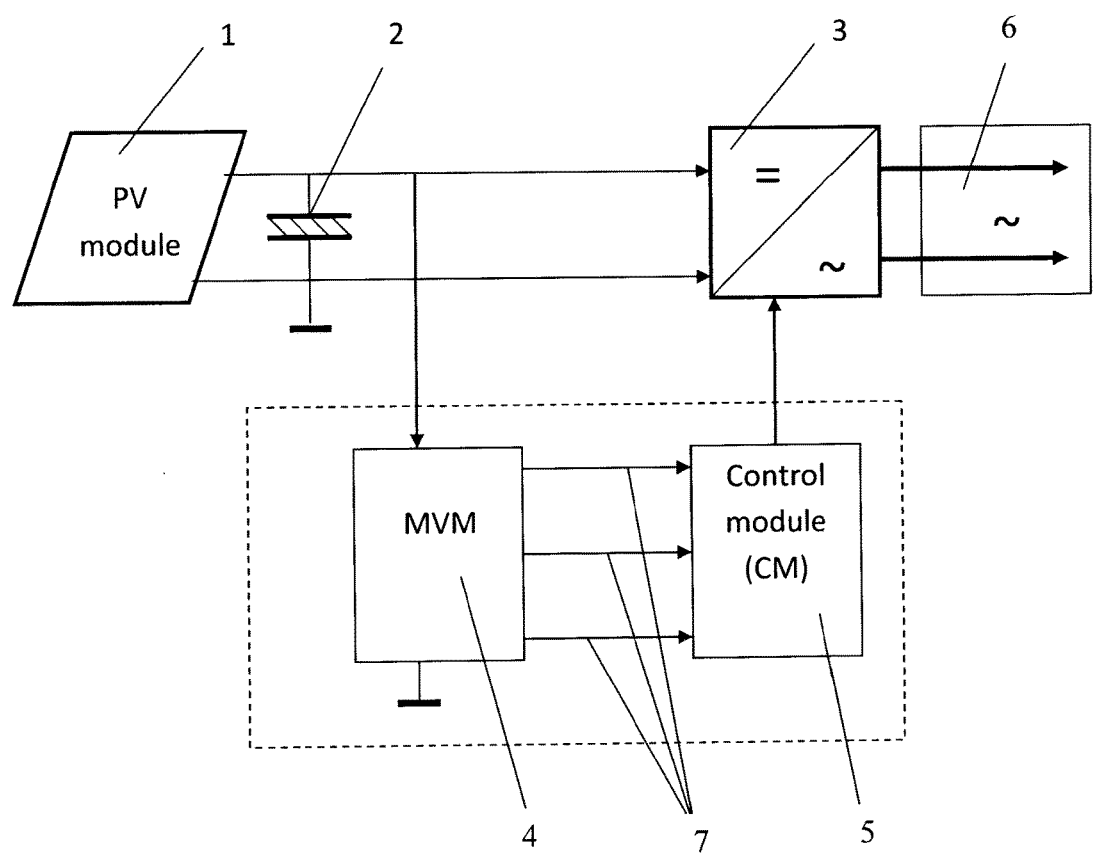
FIG. 2. Block-scheme of the apparatus for 3-level the electrical energy take-off from PV module according to the invention.

Maximum power of the DC/AC inverter (3) should be not less than the nominal power of the PV module (1). The DC/AC inverter (3) is configured to change the power of the maximum towards reduction at least at three levels. Output DC/AC inverter (3) is connected to the AC local grid (6) (FIG. 2, 3). The capacitor (2) is connected parallel to the input of the DC/AC inverter (3). The control module (5) is connected to the DC/AC inverter (3) and the means to measure the voltage of the capacitor (4). Means for measuring the voltage (4) is arranged to supply to the control module (5) an information regarding the at least three fixed pre-set values of voltage on the capacitor (2). Control module (5) is arranged to switch power levels of DC/AC inverter (3) depending on the voltage level on the capacitor (2). The internal resistance of the capacitor (2) is at least twice lower than the internal resistance of the PV module (1) at its MPP under maximum insolation. The capacitance of capacitor (2) is defined as:

$$C \geq (k \cdot P_B)/(U_B^2 - U_1^2) \qquad (7)$$

where C—capacitance in Farads, $P_B$—the maximum power PV module (1) at maximum insolation, W; $U_B$—PV module (1) voltage at the MPP at maximum insolation, V; U1—intermediate fixed voltage at the MPP at less than the maximum insolation, the closest to the voltage $U_B$, V, k—coefficient of absolute value of 0.3 . . . 0.5 sec.

The method for take-off electrical energy from PV module using the device described above as follows.

Initially, on the basis of current-voltage characteristics of PV module (1) the following parameters are measured: i) voltage $U_B$ at the MPP of PV module under maximal level of insolation, ii) voltage $U_0$ which is not less as 25% of the open circuit voltage of PV module (1) in the case of DC/AC inverter (3) and not less as 15% of the open circuit voltage of PV module in the case of DC/DC converter, iii) voltage $U_1$ at the MPP of PV module (1) under at least one intermediate level of insolation between its maximal and minimal values. Then the DC/AC inverter (3) is adjusted to one of the power levels ($P_x$), which is not less as the maximal power of PV module (1) under either minimal insolation ($P_0$), either maximal insolation ($P_B$), or at least one intermediate insolation ($P_1$) between minimal and maximal insolation. The apparatus operates in accordance with the following scenario. At arising and increasing insolation, energy from PV module (1) is transferred to the capacitor (2) and collected there continuously; and voltage ($U_C$) on the capacitor (2) is measured simultaneously. When $U_C$ achieves the value $U_0$, the means for voltage measurement (4) sends a signal to switch the control module (5) on; when $U_C$ achieves the value $U_1$ the control module (5) sends a signal to the DC/AC inverter (3) to operate at the power level $P_1$; when $U_C$ achieves the value $U_B$ the control module (5) sends a signal to the DC/AC inverter (3) to operate at the power level $P_B$. The signal lines that correspond to voltages $U_0$, $U_1$ . . . , $U_B$ are shown in FIG. 2, pos. 7. Vice versa, at decreasing insolation, the DC/AC inverter (3) consumes energy collected by the capacitor (2) and when $U_C$ drops down to the value $U_1$ the control module (5) sends a signal to the DC/AC inverter (3) to operate at the power level $P_1$; when $U_C$ drops down to the value $U_0$, the means for voltage measurement (4) sends a signal to the DC/AC inverter (3) to operate at the power level $P_0$; when $U_C$ drops down to the value lower than $U_0$, the means for voltage measurement (4) sends a signal to switch the DC/AC inverter (3) off.

Figure 4:
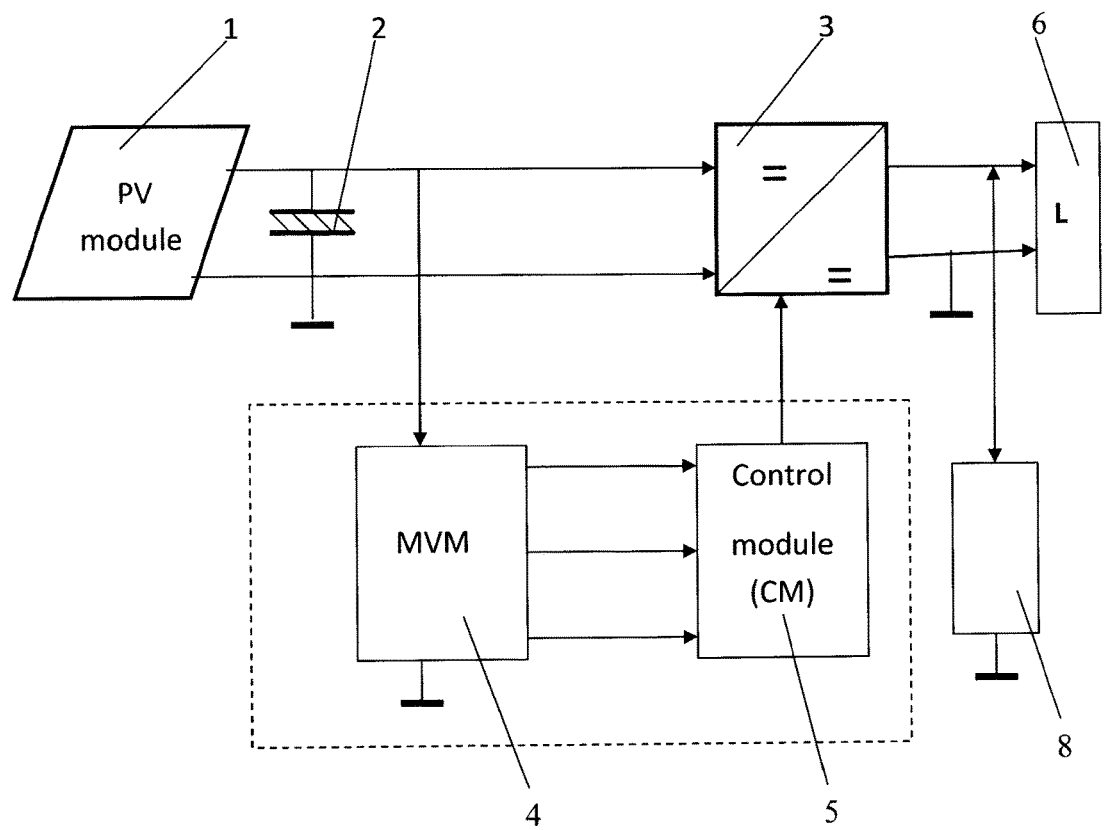
FIG. 4. Block-scheme of the apparatus for electrical energy take-off from PV module for an energy storage system according to the invention.
Figure 5:
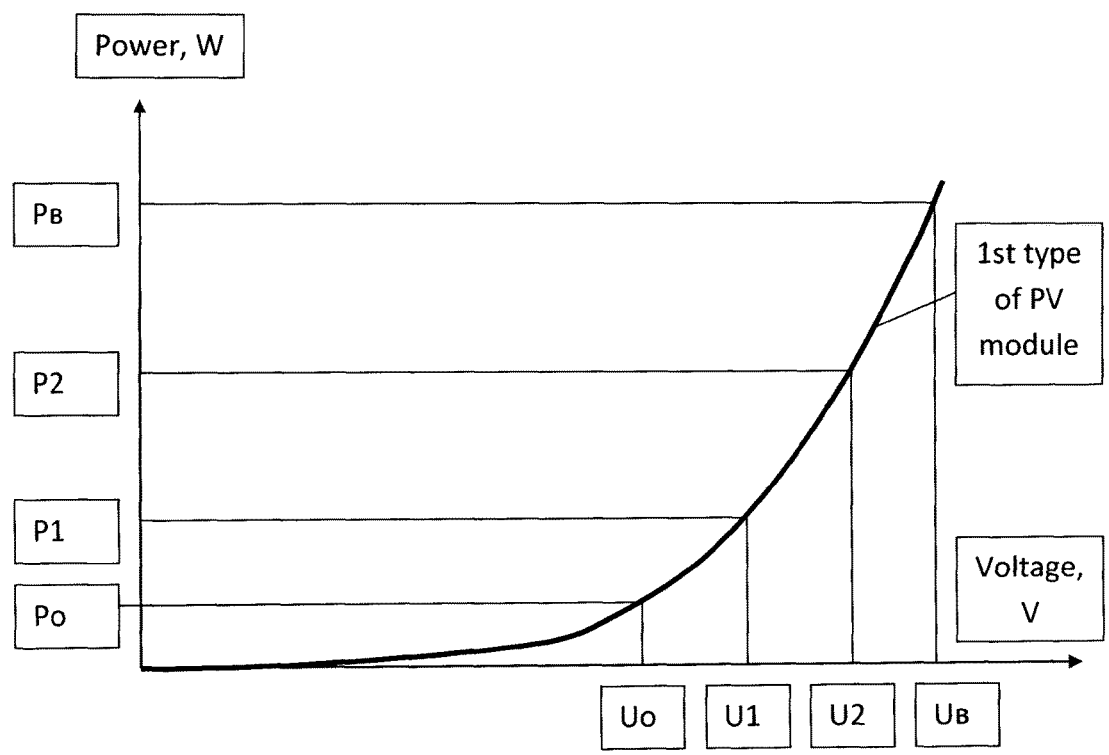
FIG. 5. Choice of different voltage to determine inverter power (1st type of PV module—polycrystalline silicon)

For realizing the method as a means for voltage measurement can be used at least three voltage threshold sensors (TS) (4), each of which forms and sends signal to the control module (5) about the presence of certain voltage at capacitor (2). An example of specific device and realization of the method using such devices with DC/AC inverter (3) is illustrated (FIG. 3). Another example illustrates realization of the method and specific device, which provides for the use of DC/DC converter (3) (FIG. 4) to supply pulsed-power load (6) or energy storage (8).

Information Verifying the Possibility of the Invention

To verify the possibility of the method for take-off of electric energy were used the followings:
- a dual stand, which allows to register amount of the received energy by two independent channels;
- 2 standard PV modules SPV-190M-24 (Sinski PV Co., Ltd) with rated power of 190 W and open circuit voltage Uoc=43.4 V were stationary installed alongside and in the same plane;
- supercapacitor (hereinafter—SC) with electrical capacity of 5.2 F and operating voltage of 42 V;
- electronic circuit that commits the energy extraction in a constant load mode.

Example 1

Experimental verification of the identity of both channels on the registration of energy amount was carried out at different levels of insolation. Level of average insolation was assessed by normalizing the average power obtained through channel 1 for a specified exposition to rated power of PV module. Exposures time was chosen arbitrarily, but not less than 60 seconds. Test results are given in Table 7 of this description. To check the proposed method for take-off electrical energy, the EETOS apparatus was included in channel 2 and tested similarly to channel 1. The results of this testing are given in Table 7. Channel 2 with the included EETOS apparatus, that is the subject of the invention, showed better performance at all levels of insolation. The effectiveness of the EETOS apparatus increases with decreasing insolation level from 103.2% if the insolation level is 91.2% to 3309% if the insolation level is 0.1% of the rated power of PV module.

TABLE 7

The average power received from the PV modules with rated power of 190 W under condition of EETOS system application (Comparative Table)

| Insolation level | Channel 1 and Channel 2 are equally loaded under the same insolation level (both channels without EETOS application) | | | Channel 1 and Channel 2 are equally loaded under the same insolation level (Channel 2 with EETOS application) | | |
|---|---|---|---|---|---|---|
| | Channel 1 The average power $P_1$, W | Channel 2 The average power $P_2$, W | Ratio $P_2/P_1$, % | Channel 1 The average power $P_1$, W | Channel 2 The average power $P_2$, W | Ratio $P_2/P_1$, % |
| 1 | 2 | 3 | 4 | 5 | 6 | 7 |
| 0.0% | * | * | * | 0.02 | 2.49 | 12450.0% |
| 0.1% | 0.16 | 0.23 | 143.8% | * | * | * |
| 0.1% | * | * | * | 0.21 | 6.95 | 3309.5% |
| 0.4% | 0.8 | 1.13 | 141.3% | * | * | * |
| 0.7% | 1.33 | 1.76 | 132.3% | * | * | * |
| 1.0% | 1.83 | 2.22 | 121.3% | * | * | * |
| 0.9% | 1.65 | 2.16 | 130.9% | * | * | * |
| 1.4% | 2.72 | 3.14 | 115.4% | * | * | * |
| 2.2% | * | * | * | 4.23 | 21.19 | 500.9% |
| 2.8% | 5.23 | 6.2 | 118.5% | * | * | * |
| 2.8% | 5.41 | 6.49 | 120.0% | * | * | * |
| 3.8% | * | * | * | 7.13 | 26.68 | 374.2% |
| 5.1% | 9.77 | 11.38 | 116.5% | * | * | * |
| 5.3% | * | * | * | 10.11 | 35.30 | 349.2% |
| 7.8% | * | * | * | 14.86 | 40.91 | 275.3% |
| 8.3% | * | * | * | 15.69 | 44.11 | 281.1% |
| 8.9% | 16.87 | 18.71 | 110.9% | * | * | * |
| 11.7% | * | * | * | 22.38 | 48.84 | 218.2% |
| 12.1% | 22.91 | 25.11 | 109.6% | * | * | * |
| 17.3% | 32.96 | 35.07 | 106.4% | * | * | * |
| 19.2% | * | * | * | 36.50 | 63.57 | 174.2% |
| 23.0% | 43.61 | 45.34 | 104.0% | * | * | * |
| 23.0% | 43.62 | 44.45 | 101.9% | * | * | * |
| 25.1% | * | * | * | 47.71 | 71.14 | 149.1% |
| 29.7% | 56.40 | 57.37 | 101.7% | * | * | * |
| 30.9% | 58.70 | 59.63 | 101.6% | * | * | * |
| 32.8% | 62.27 | 63.20 | 101.5% | * | * | * |
| 33.6% | * | * | * | 63.88 | 83.75 | 131.1% |
| 37.2% | 70.75 | 71.44 | 101.0% | * | * | * |
| 37.4% | 71.09 | 71.98 | 101.3% | * | * | * |
| 39.2% | 74.50 | 75.43 | 101.2% | * | * | * |
| 45.7% | 86.74 | 87.42 | 100.8% | * | * | * |
| 46.7% | 88.80 | 90.13 | 101.5% | * | * | * |
| 50.0% | * | * | * | 95.04 | 104.28 | 109.7% |
| 55.8% | 106.01 | 106.98 | 100.9% | * | * | * |
| 59.9% | 113.79 | 116.53 | 102.4% | * | * | * |
| 91.2% | * | * | * | 173.31 | 178.93 | 103.2% |
| 100.0% | 190.00 Nominal power | — | — | — | — | — |

* - measurement wasn't carried out

Example 2

Experimental verification of the effectiveness of the proposed method for take-off electrical energy was performed by monitoring the work of both channels around the daylight hours. Evaluation of the average insolation throughout the daylight hours was performed by normalizing the amount of energy from channel 1 to the maximum amount of energy received per daylight hours in channel 1 during the entire period of observation. Channel 2 operated either with included EETOS apparatus (09/24 and 09/25) or without it. The test results are given in Table 8. The proposed method has allowed to increase the amount of energy received per daylight hours by 27.8% and 22.9% at an average insolation of 80.1% and 88.5% respectively.

TABLE 8

The Total Energy received from the PV modules with nominal power of 190 W at condition of EETOS system application (Comparative Table)

Channel 1 and Channel 2 are equally loaded under the same insolation

| Date (day and month) | Insolation level, % | Channel 1 Energy, $E_1$, J | Channel 2 Energy, $E_2$, J | Ratio $E_2/E_1$, % | Comments |
|---|---|---|---|---|---|
| 14.09 | 52.8% | 1299161 | 1326644 | 102.1% | without EETOS |
| 16.09 | 24.0% | 591958 | 614582 | 103.8% | without EETOS |
| 19.09 | 73.7% | 1815613 | 1861046 | 102.5% | without EETOS |
| 20.09 | 73.7% | 1815601 | 1859295 | 102.4% | without EETOS |
| 21.09 | 79.8% | 1965744 | 2074504 | 105.5% | without EETOS |
| 24.09 | 80.1% | 1973170 | 2521434 | 127.8% | Channel 2 with EETOS application |
| 25.09 | 88.5% | 2180443 | 2679508 | 122.9% | Channel 2 with EETOS application |
| Nominal power | 100.0% | 2462440 | — | — | — |

Example 3

Figure 6:
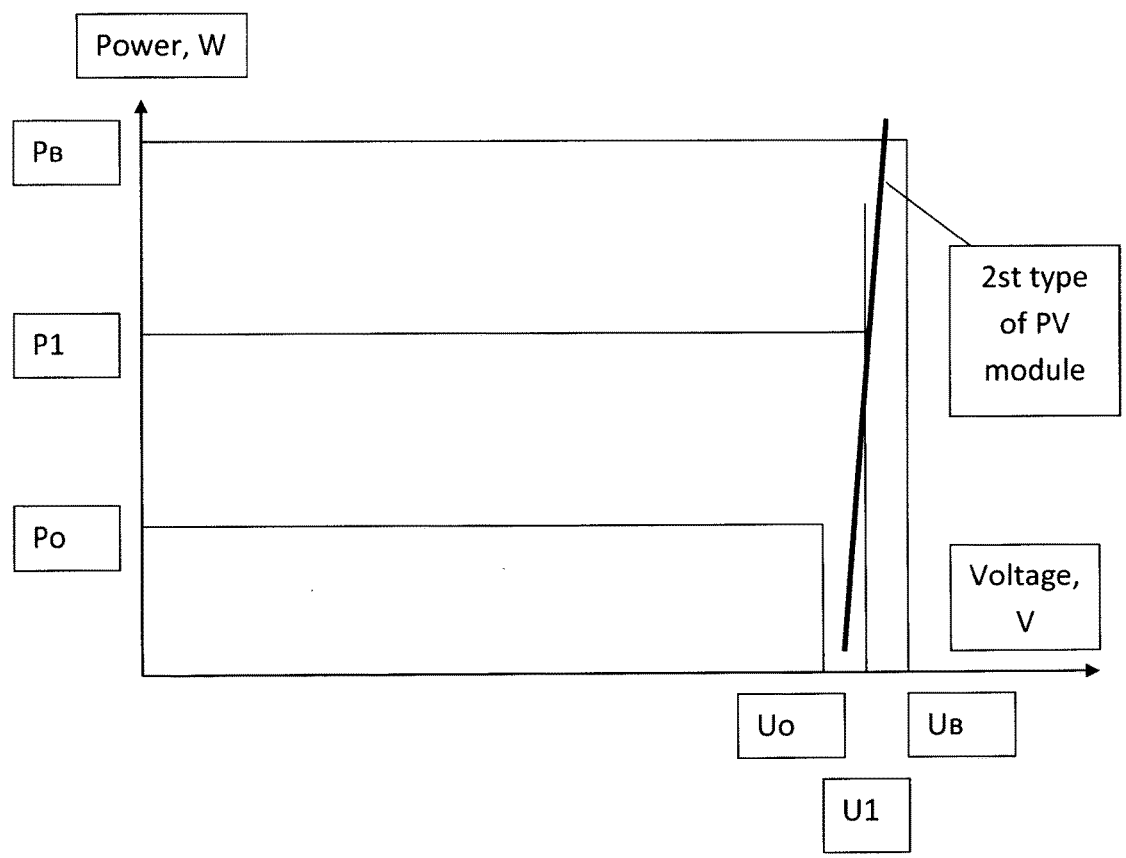
FIG. 6. Choice of different voltage to determine inverter power (2nd type of PV module—monocrystalline silicon)
Figure 7:
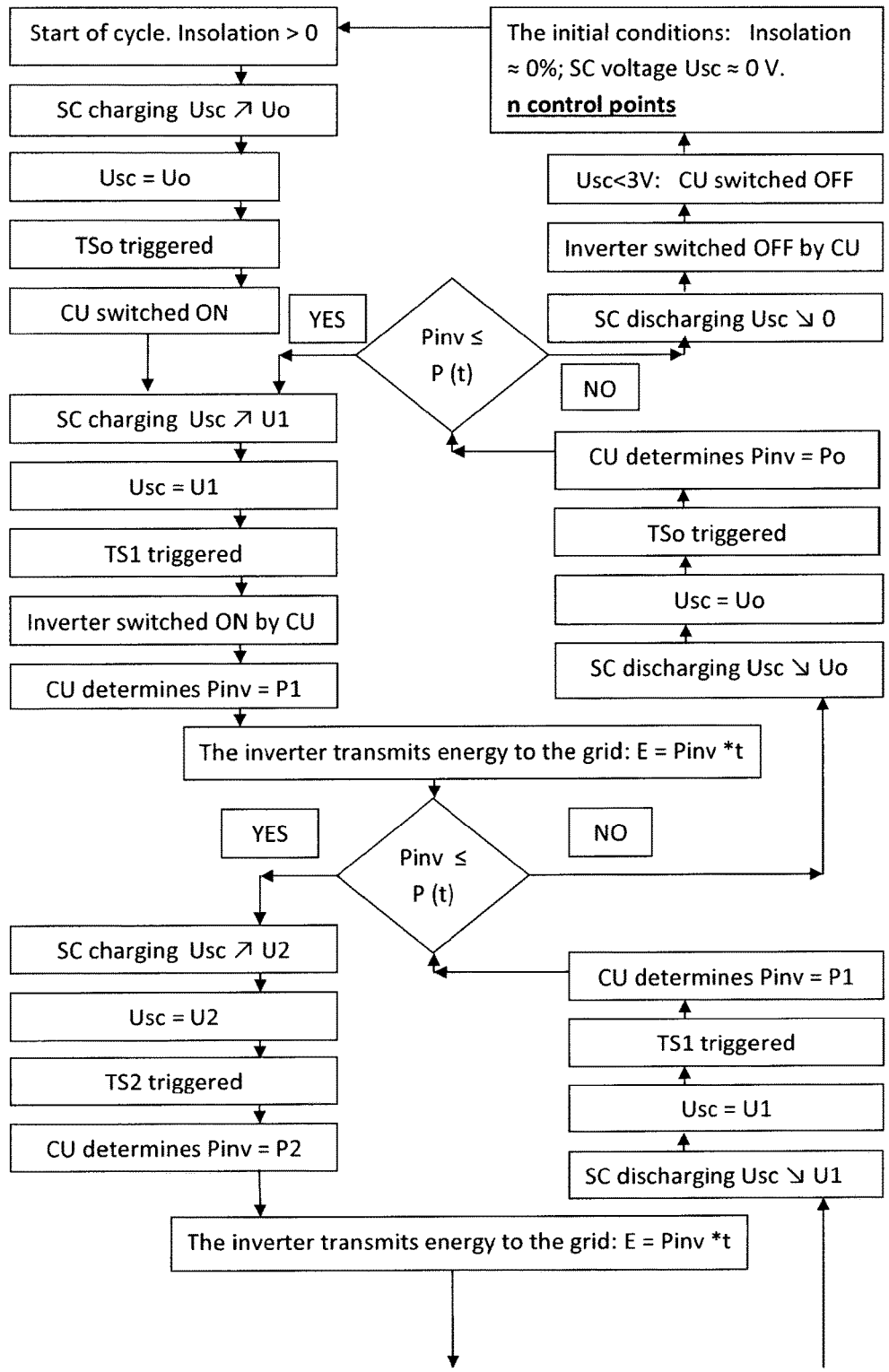
FIG. 7. Block-scheme of the algorithm for the apparatus functioning at n control points (n=4)
Figure 8:
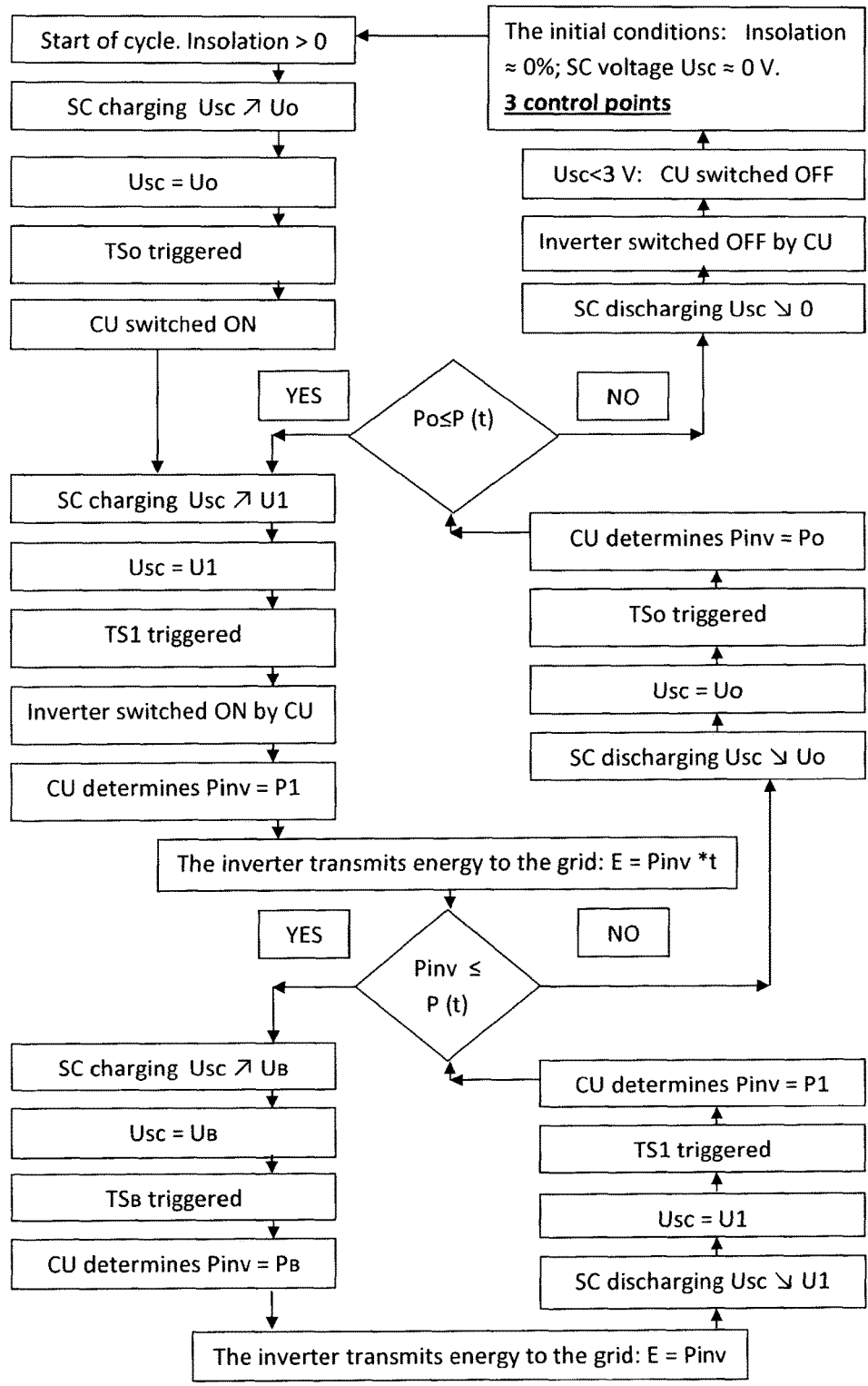
FIG. 8. Block-scheme of the algorithm for the apparatus functioning at the three-point control.

PV module made on the base of monocrystalline silicon cells was used for experimental verification of feasibility of the proposed apparatus. In accordance with the specification PV module has the following parameters: rated power—190 W, open circuit voltage Uoc=43.4 V, short-circuit current—6.5 A, internal resistance—6.3 Ohm, the calculated MPP voltage Umpp=0.8·Uoc=34.7 V. For PV module based on monocrystalline silicon cells a dependence of MPP on the insolation level is typical and close to the type 2 (FIG. 6). In this case, the method for take-off electrical energy was realized by adjusting system to three voltage levels using three voltage threshold sensors (4) and inverter with three power levels (3). Capacitor (2) consists of 7 modules BSC 6-30 based on structurally perfect carbon forms and aqueous electrolyte. In accordance with the BSC 6-30 specification it has: electrical capacity—30 F, internal resistance—less as 0.15 Ohm, and the optimal current—10 A. In this case, electrical capacity of Capacitor (2) is 4.5 F at operating voltage of 42 V. The internal resistance of Capacitor (2) is 1.05 Ohms, that is 6 times lower than internal resistance of PV module (1) at MPP.

As a DC/AC inverter (3) was used microinvertor MICRO-0.25-I-OUTD-208/240 manufacture of Power-One Inc. (Aurora Micro), designed to operate with individual PV module. In accordance with the Aurora Micro specification it has: rated power at the input—up to 265 W, operating voltage—from 12 to 60 V, maximum current—12.5 A. Aurora Micro has a MPPT function for the input voltage in the range from 25 to 50 V, that allows smoothly change its power from 0.2 to 250 W. The minimum operating voltage, allowing DC/AC conversion, is 12 V, that is 27.6% of the PV module open circuit voltage Uoc=43.4 V or 20% of the maximum open circuit voltage permitted by its specification. At the output Aurora Micro provides AC with rated power of 250 W at 230 V and 50 Hz. Measurement of input and output voltage, frequency, current, power and energy output were carried out by regular means Aurora Micro and visualized via unit for data collection (Aurora CDD).

AC line with voltage 220 V and 50 Hz was used as local grid (6).

To implement the control module, three voltage TS (4) were manufactured on the base of low-power bipolar transistors KT 315 and logic microcircuits K364 series, produced by MOS technology. Accordingly to the operating algorithm with three management levels, the $TS_B$, TS1, and $TS_O$ were configured on the next voltages: $U_B$=34.7 V, U1=32.0 V $U_O$=29.5 V. When the threshold voltage is achieved, the corresponding TSn changes the output signal, e.g. from '1' to '0' or vice versa from '0' to '1'.

When the threshold voltage is achieved, the corresponding TSn changes the output signal, e.g. from '1' to '0' or vice versa from '0' to '1'.

The control module (5) has been manufactured on the base of field-effect transistors MOSFET (IRF3710PBF, STW12NK80Z), which are characterized by a low voltage drop at open mode. The control module (5) receives signals from the TSn in a standard digital form and generates corresponding control signals for MOSFET managing also in the form of a digital signal (5V). In accordance with commands of control module (5), DC/AC inverter (3) is switched to the appropriate power level, namely $P_O$=50 W, $P_B$=200 W, P1=100 W.

During these experiments it was found, that if open circuit voltage of PV module decreases below 25% of its rated value, the work of DC/AC inverter becomes unstable, therefore, the reliable technical result can not be established. Accordingly, the implementation method and apparatus with the use of DC/DC converter when open circuit voltage of PV module decreases below 15% of its rated value, the reliable technical result can not be established.

Example 4 describes the results of experimental verification of higher efficiency of the systems with EETOS apparatus in take-off energy from the PV module in a wide range of insolation levels as compared to efficiency of the systems with MRRT function.

For this experiment PV panel with rated power of 190 W and microinvertor MICRO-0.30-I-OUTD-208/240 production of Power-One Inc. (Aurora Micro) described in previous examples 1-3 were used. To test the efficiency of the proposed method, the EETOS apparatus was included in Channel 1 and Aurora Micro with MRRT function was included in Channel 2. For both channels 1 and 2 the identical insolation and the similar testing procedures have been applied. Test results are shown in Table 9. These results indicate that for all insolation levels a higher efficiency was observed for Channel 1 with the EETOS apparatus, which is the subject of the present invention. In this case the gain in energy received from PV module is of 21.1%, indicating reduction of the energy losses during electric power take-off from PV module, i.e. achieving the technical results due to exploiting the method and the apparatus in accordance with the present invention.

TABLE 9

The Total Energy received from the PV modules with rated power of 190 W under condition of EETOS system (Channel 1) and MPPT (Channel 2) application (Comparative Table)

| Exposition time | | Channel 1 with EETOS system application | | Channel 2 with microinverter Aurora30 (MPPT) application | | |
|---|---|---|---|---|---|---|
| Start 1 | Time, sec 2 | The average power $P_1$, W 3 | Energy E1, J 4 | The average power $P_2$, W 5 | Energy E2, J 6 | Ratio E1/E2, % 7 |
| 9_32 | — | — | — | — | — | — |
| 9_41 | 540 | 39.92 | 21557 | 0.13 | 70 | 30707.7% |
| 10_00 | 1140 | 73.23 | 83482 | 63.60 | 72504 | 115.1% |
| 10_20 | 1200 | 37.89 | 45468 | 2.91 | 3492 | 1302.1% |
| 10_40 | 1200 | 88.16 | 105792 | 83.01 | 99612 | 106.2% |
| 11_00 | 1200 | 86.94 | 104328 | 76.86 | 92232 | 113.1% |
| 11_20 | 1200 | 95.00 | 114000 | 94.56 | 113472 | 100.5% |
| 11_40 | 1200 | 87.45 | 104940 | 71.40 | 85680 | 122.5% |
| 12_00 | 1200 | 65.88 | 79056 | 63.09 | 75708 | 104.4% |
| 12_21 | 1260 | 100.61 | 126769 | 83.20 | 104832 | 120.9% |
| 12_40 | 1140 | 139.36 | 158870 | 134.97 | 153866 | 103.3% |
| 13_00 | 1200 | 130.88 | 157056 | 128.52 | 154224 | 101.8% |
| 13_20 | 1200 | 84.60 | 101520 | 75.15 | 90180 | 112.6% |
| 13_40 | 1200 | 114.73 | 137676 | 102.27 | 122724 | 112.2% |
| 14_00 | 1200 | 94.82 | 113784 | 83.22 | 99864 | 113.9% |
| 14_20 | 1200 | 51.55 | 61860 | 10.53 | 12636 | 489.6% |
| 14_40 | 1200 | 114.54 | 137448 | 94.23 | 113076 | 121.6% |
| 15_00 | 1200 | 43.94 | 52728 | 33.51 | 40212 | 131.1% |
| 15_20 | 1200 | 12.24 | 14688 | 7.59 | 9108 | 161.3% |
| 15_40 | 1200 | 14.68 | 17616 | 9.90 | 11880 | 148.3% |
| 16_00 | 1200 | 21.83 | 26196 | 16.62 | 19944 | 131.3% |
| 16_20 | 1200 | 11.91 | 14292 | 7.74 | 9288 | 153.9% |
| 16_40 | 1200 | 14.12 | 16944 | 9.57 | 11484 | 147.5% |
| 17_00 | 1200 | 10.29 | 12348 | 0.24 | 288 | 4287.5% |
| 17_20 | 1200 | 5.52 | 6624 | 3.15 | 3780 | 175.2% |
| 17_40 | 1200 | 1.19 | 1428 | 0.27 | 324 | 440.7% |
| Total | 29280 | — | 1816470 | — | 1500480 | 121.1% |

Simulations and investigations have also shown that the effectiveness of the EETOS apparatus depends on the number of levels of inverter power and appropriately defined for measuring PV module voltage at intermediate insolation levels. Increasing the number of points of regulation causes to a decrease in the difference between the power levels set in the inverter or converter; and accordingly it has a positive effect on improving the efficiency of the whole system, but negatively affects its cost.

Experiments with PV modules up to 190 watts and open circuit voltage of 40 volts showed that technical result already manifested at presence for at least three power levels with the voltage difference between neighboring points of regulation from 1 volt to 2.5 volt. Reducing differences the voltage to a value less than 1 volt leads to increase capacity of capacitor and complicates the device as a whole and, therefore, becomes uneconomical. The optimal value of voltage difference between the voltages neighboring points of regulation should be set in the range of 3% to 5% of the PV module open circuit voltage.

1. U.S. Pat. No. 7,709,727. Circuit arrangement for a photovoltaic system.—issued 4 May 2010.
2. U.S. Pat. No. 7,456,523. Power generation system, and administration apparatus and administration method of power generation system.—issued 25 Nov. 2008.
3. The U.S. Pat. No. 8,400,134. Apparatus and methodology for maximum power point tracking for a solar panel.—issued 19 Mar. 2013.
4. U.S. Pat. No. 7,808,213. Flexible power apparatus.—issued 5 Oct. 2010.
5. EP Patent 2075895. Flexible power supply apparatus.—issued 5 Jan. 2011.
6. UA Patent 51651. Device and method for energy extraction from the photoelectric converter.—issued 16 Dec. 2002.
7. RU Patent 2195754. Device and method for energy extraction from the solar battery.—issued 27 Dec. 2002.

The invention claimed is:

1. An apparatus for electrical energy take-off from a photovoltaic module (PVM), the apparatus comprising:
   one of
      a DC/AC inverter having a maximum power not less than a nominal power of the PVM, and configured to connect an output of the DC/AC inverter to a local AC electrical power distribution system, or
      a DC/DC converter having a maximum power not less than the nominal power of the PVM, and configured to connect to an input of an energy storage system;

a capacitor connected in parallel between the PVM and one of an input of the DC/AC inverter or an input of the DC/DC converter;

a means for voltage measurement on the capacitor; and a control module connected to one of the DC/AC inverter or the DC/DC converter and further connected to the means for voltage measurement on the capacitor, wherein the DC/AC inverter and the DC/DC converter are configured to switch between at least three power levels, wherein the means for voltage measurement is configured to supply data to the control module regarding at least three predetermined fixed values of the capacitor voltage, the control module is configured to switch the at least three power levels of one of the DC/AC inverter or the DC/DC converter depending on the capacitor voltage, wherein an internal resistance of the capacitor is at least half of an internal resistance of the PVM at a maximum power point (MPP) of the PVM, and wherein capacity of the capacitor is defined as follows:

$$C \geq (k \ast P_B)/(U_B^2 - U_1^2),$$

where

C is capacitance of the capacitor in Farads (F);

$P_B$ is maximal power of PVM under its maximal insolation in Watts (W);

$U_B$ is voltage of PVM at the maximum power point under maximal insolation in Volts (V);

$U_1$ is an intermediate fixed voltage at the maximum power point under insolation that is less than maximal insolation closest to the $U_B$ in Volts (V); and k is a factor with an absolute value of 0.3-0.5 seconds (sec).

2. The apparatus of claim 1, wherein the DC/AC inverter comprises a combined unit of one or more DC/DC converters at the input of the DC/AC inverter and a DC/AC inverter at the output of the DC/AC inverter.

3. The apparatus of claim 1, wherein the means for voltage measurements comprises at least three threshold devices, each of the at least three threshold devices generates a signal indicating a voltage value of the capacitor.

4. The apparatus of claim 1, wherein the control module comprises a microprocessor.

5. The apparatus of claim 1, wherein the control module comprises hardwired logic elements.

* * * * *